(12) United States Patent
George et al.

(10) Patent No.: US 7,520,298 B2
(45) Date of Patent: Apr. 21, 2009

(54) ROTARY FLUID FLOW VALVE

(75) Inventors: William George, Parkton, MD (US); John Kohlman, Columbia, MD (US); Stuart R. Amos, Phoenix, MD (US)

(73) Assignee: HRP Technology, Inc., Baltimore, MD (US)

( * ) Notice: Subject to any disclaimer, the term of this patent is extended or adjusted under 35 U.S.C. 154(b) by 448 days.

(21) Appl. No.: 11/282,909

(22) Filed: Nov. 18, 2005

(65) Prior Publication Data

US 2006/0108011 A1 May 25, 2006

Related U.S. Application Data

(60) Provisional application No. 60/629,124, filed on Nov. 18, 2004.

(51) Int. Cl.
  *F16K 11/074* (2006.01)
  *A47L 7/00* (2006.01)
  *A47L 9/00* (2006.01)

(52) U.S. Cl. .............. 137/625.21; 137/625.43; 15/330; 15/345; 134/21

(58) Field of Classification Search ............ 137/625.21, 137/625.43; 15/330, 345; 134/21
See application file for complete search history.

(56) References Cited

U.S. PATENT DOCUMENTS

| | | | |
|---|---|---|---|
| 2,049,603 A * | 8/1936 | Dietenberger | 15/327.1 |
| 2,623,234 A * | 12/1952 | Brown | 15/330 |
| 4,088,301 A | 5/1978 | Ehmig | |
| 4,169,489 A | 10/1979 | Inada et al. | |
| 4,258,752 A | 3/1981 | Liebert et al. | |
| 4,329,161 A | 5/1982 | Osborn | |
| 4,415,139 A | 11/1983 | Potts | |
| 4,450,864 A | 5/1984 | Huckebrink | |
| 4,520,847 A * | 6/1985 | Baron | 137/625.43 |
| 4,739,794 A | 4/1988 | Ballun | |
| 4,841,595 A * | 6/1989 | Wiese | 15/352 |
| 4,921,015 A | 5/1990 | Sedy | |
| 4,933,017 A | 6/1990 | Brzoska | |
| 5,105,504 A | 4/1992 | Brzoska | |
| 5,153,493 A | 10/1992 | Jornod et al. | |
| 5,193,245 A | 3/1993 | Brzoska | |
| 5,299,599 A * | 4/1994 | Farmer et al. | 137/625.22 |
| 5,416,947 A | 5/1995 | Jaffe | |
| 5,664,284 A | 9/1997 | Brzoska | |
| 6,302,372 B1 | 10/2001 | Sauer et al. | |
| 6,431,518 B1 | 8/2002 | Geiser | |
| 6,499,507 B1 | 12/2002 | Hochrein et al. | |
| 7,310,853 B2 * | 12/2007 | Cho | 15/330 |
| 2005/0166946 A1 | 8/2005 | Amos | |

* cited by examiner

*Primary Examiner*—John Rivell
(74) *Attorney, Agent, or Firm*—Alan G. Towner, Esq.; Pietragallo Gordon Alfano Bosick & Raspanti, LLP (57) ABSTRACT

A rotary valve having inner and outer sleeves includes multiple ports configured to provide pressure and vacuum pulses when the sleeves are rotated with respect to each other. A source of pressure and vacuum is connected to the rotary valve, and the inner sleeve is rotated to generate pressure and vacuum pulses. The alternating pressure and vacuum pulses may be used to remove obstructions in conduits such as piping systems. The rotary valve may also provide static positions where no vacuum or pressure is available. The valve may be motor driven and the pressure/vacuum pulse frequency may be controlled based upon the relative speed of rotation of the sleeves.

37 Claims, 8 Drawing Sheets

ROTARY FLUID FLOW VALVE

CROSS-REFERENCE TO RELATED APPLICATION

This application claims the benefit of U.S. Provisional Patent Application Ser. No. 60/629,124 filed Nov. 18, 2004, which is incorporated herein by reference.

FIELD OF THE INVENTION

The present invention relates to a rotary fluid flow valve, and more particularly relates to a rotary valve which produces pressure and vacuum pulses over a range of frequencies which may be applied to various types of conduits.

BACKGROUND INFORMATION

Clogs are a common problem in any device in which flowable materials flow through conduits and narrow passages. Examples of conduits in which clogs occur include drains of plumbing fixtures such as sinks, toilets, bathtubs and showers. Additional examples of conduits in which clogs can occur are automobile radiators/cooling systems, heat exchangers and marine engine cooling systems (outboard, inboard and inboard/outboard), especially those that use seawater for cooling.

One method for cleaning clogs in drains involves the use of a cable drain tool, such as a snake. However, tools such as these may damage plumbing fixtures and may prove difficult to use in some situations such as sinks and bathtubs with drains having narrow passages and/or a series of bends. Another method for cleaning clogs involves the use of high pressure devices such as a jetter, however, such devices may rupture plumbing joints.

A further method for cleaning drains includes using chemicals including caustics and acids. This method has drawbacks in that many types of chemicals may be highly detrimental to plumbing systems and plumbing fixtures and may cause personal injury and/or destroy metal fittings. Additionally, caustic chemicals may damage PVC pipes and acids may damage porcelain.

Although chemicals, abrasives, disinfectants and other agents may be used to remove grease, scale, bacteria, hair and other forms of material which block flow through various types of conduits, a limitation of these chemicals is their need to reach the surface of the conduit affected by the contamination in a uniform and effective way and to stay in contact long enough to be effective. The effect of gravity alone tends to force the chemical or agent to the lower surface of the conduits, leaving upper surfaces untouched and untreated. Mechanical methods, e.g., jetters, are sometimes employed to introduce cleaning solutions into contaminated conduits, but these tend to utilize very active chemicals or agents and reduce the contact time with the contaminated surface. Furthermore, such methods cannot negotiate many types of turns and traps in typical conduit installations.

Devices which manually apply pressure and vacuum pulses have been developed. Examples of such devices are described in U.S. Pat. Nos. 5,664,284; 5,193,245; 5,105,504; and 4,933,017, which are incorporated herein by reference. These devices have proven successful in clearing clogs in a wide variety of applications.

U.S. application Ser. No. 10/991,688 filed Nov. 18, 2004, which is incorporated herein by reference, discloses a modification of the devices in the above-noted patents in which an operator can variably control the amount of pressure and/or vacuum through the use of a controller mounted near the distal end of the hose of the device.

The above-noted devices may require the operator to move a control handle or lever back and forth from the pressure position to the vacuum position. The operator may thus manipulate the lever/handle too quickly or too slowly for effective wave action to be produced in the conduit. Also, to maximize the pressure or vacuum produced, the control lever/handle needs to be held tightly against the stop at the end of travel in either the pressure or vacuum directions. It would be desirable to eliminate the reciprocating action of the control lever/handle of such devices.

SUMMARY OF THE INVENTION

The present invention provides an apparatus and method for generating pressure and vacuum pulses through the use of a rotary valve. A pressure and vacuum source is connected to the rotary valve, and an output hose from the valve delivers alternating pressure and vacuum pulses to a conduit such as a piping system. The rotary valve may be generally cylindrical, with an inner cylindrical sleeve that rotates with respect to an outer cylindrical sleeve to align pressure and vacuum ports in the sleeves at different rotational portions. The inner sleeve may be motor driven at constant or variable rates which effectively produce the desired pressure and vacuum pulses. The motor or manual drive of the rotary valve may be uni-directional or bi-directional, and the alternating pressure and vacuum valve opening times may be controlled to provide precise chemical treatment positioning. Continuous rotation of the inner cylindrical sleeve avoids the problems associated with conventional reciprocating valve designs. The creation of alternating pulses or waves in accordance with the present invention allows chemicals, abrasives, disinfectants or other agents to be uniformly distributed on all inner surfaces of the conduit due to the pulse wave action generated by the rotary valve.

An aspect of the present invention is to provide a system for providing alternating pressure and vacuum pulses to a conduit. The system comprises a source of pressure and vacuum, and a rotary valve communicating with the source of pressure and vacuum. The rotary valve comprises an outer sleeve having pressure and vacuum ports in flow communication with the source of pressure and vacuum, and an output port for delivering the alternating pressure and vacuum pulses to the conduit. The rotary valve also comprises an inner sleeve including pressure and vacuum ports rotatably mounted at least partially inside the outer sleeve. When the inner sleeve is located at a first rotational position with respect to the outer sleeve, a pressure port of the inner sleeve is aligned with a pressure port of the outer sleeve to deliver pressure to the outlet port of the outer sleeve. When the inner sleeve is located at a second rotational position with respect to the outer sleeve, a vacuum port of the inner sleeve is aligned with a vacuum port of the outer sleeve to deliver vacuum to the outlet port of the outer sleeve.

Another aspect of the present invention is to provide a rotary valve for providing alternating pressure and vacuum pulses. The rotary valve comprises an outer sleeve including a pressure port structured and arranged for connection to a source of pressure, a vacuum port structured and arranged for connection to a source of vacuum, and an outlet port. The rotary valve also comprises an inner sleeve rotatably mounted at least partially inside the outer sleeve including a pressure port aligned with the pressure port of the outer sleeve when the inner sleeve is located at a first rotational position with respect to the outer sleeve, a vacuum port aligned with the vacuum port of the outer sleeve when the inner sleeve is located at a second rotational position with respect to the outer sleeve, and at least one outlet port in flow communication with the outlet port of the outer sleeve.

A further aspect of the present invention is to provide a method of generating alternating pressure and vacuum pulses. The method comprises providing a rotary valve having an outer sleeve and an inner sleeve rotatably mounted at least partially inside the outer sleeve. Pressure is delivered to a pressure port of the outer sleeve; vacuum is delivered to a vacuum port of the outer sleeve; and the inner sleeve is rotated with respect to the outer sleeve to deliver pressure through the pressure port of the outer sleeve, through a pressure port of the inner sleeve, through an outlet port of the inner sleeve, and through an outlet port of the outer sleeve to generate the pressure pulse. The inner sleeve is further rotated with respect to the outer sleeve to deliver vacuum through the vacuum port of the outer sleeve, through a vacuum port of the inner sleeve, through the outlet port of the inner sleeve, and through the outlet port of the outer sleeve to generate the vacuum pulse.

These and other aspects of the present invention will be more apparent from the following description.

BRIEF DESCRIPTION OF THE DRAWINGS

FIGS. 3-5 are longitudinal sectional views of the rotary valve of FIG. 2. In FIG. 5, the inner cylindrical sleeve is rotated to a no-flow position between the pressure and vacuum positions.

DETAILED DESCRIPTION

The present invention will be discussed with reference to preferred embodiments of conduit treatment devices including rotary valves for generating pressure and vacuum pulses. Specific details are set forth in order to provide a thorough understanding of the present invention. The preferred embodiments discussed herein should not be understood to limit the invention.

Figure 1:
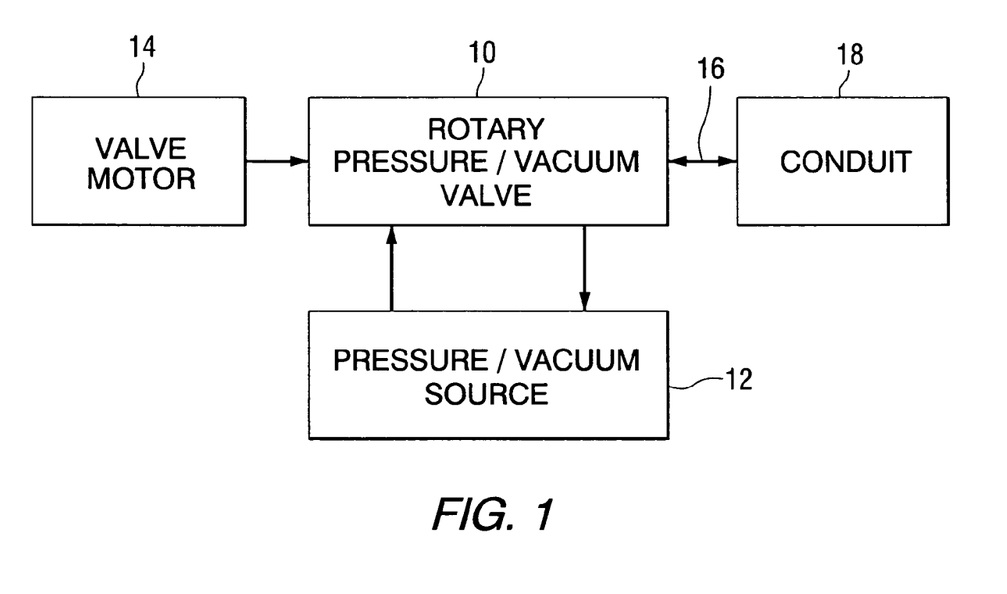
FIG. 1 is a schematic diagram of a rotary valve system for delivering pressure and vacuum pulses through a rotary valve to a conduit in accordance with an embodiment of the present invention.

FIG. 1 schematically illustrates a rotary valve system for delivering pressure and vacuum pulses in accordance with an embodiment of the present invention. The system includes a rotary valve 10 which is connected to a source of pressure and vacuum 12. The pressure and vacuum source 12 may comprise a standard motor and blower combination, for example, motorized blowers as found in conventional vacuum cleaners, wet/dry vacs, and the like. Although a combined source of pressure and vacuum is primarily described herein, the source of pressure and vacuum may also include separate pressure and vacuum generators in accordance with the invention. A valve motor 14 is connected to the rotary valve 10 and serves to drive an inner cylindrical sleeve of the valve, as more fully described below. Any suitable valve motor 14 may be used, such as standard variable or constant speed electric motors or the like. A reversing motor may be used to provide alternating forward/reverse motion if desired for a particular application. Furthermore, stepper type motors may be used to position the fluid being driven by the alternating pressure and vacuum pulses. Such motors have the ability to vary the amount of time the rotary valve provides either pressure or vacuum. For example, pressure may be applied for a predetermined time to deliver a certain amount of chemical to a contaminated or clogged pipe some distance from the delivery point, followed by the generation of alternating pressure and vacuum pulses to treat that specific area.

The rotary valve 10 is connected by a pressure and vacuum outlet hose 16 to a conduit 18. The conduit 18 may comprise plumbing systems, drains, cooling systems, heat exchangers, pipes, fluid delivery lines, beverage delivery lines, powder delivery lines, medical equipment requiring disinfecting, dental chairs and the like. The conduit 18 may contain a partial or total clog, residue, corrosion, contaminants or any other material which may be subjected to alternating pressure and vacuum pulses in accordance with the present invention.

Figure 2:
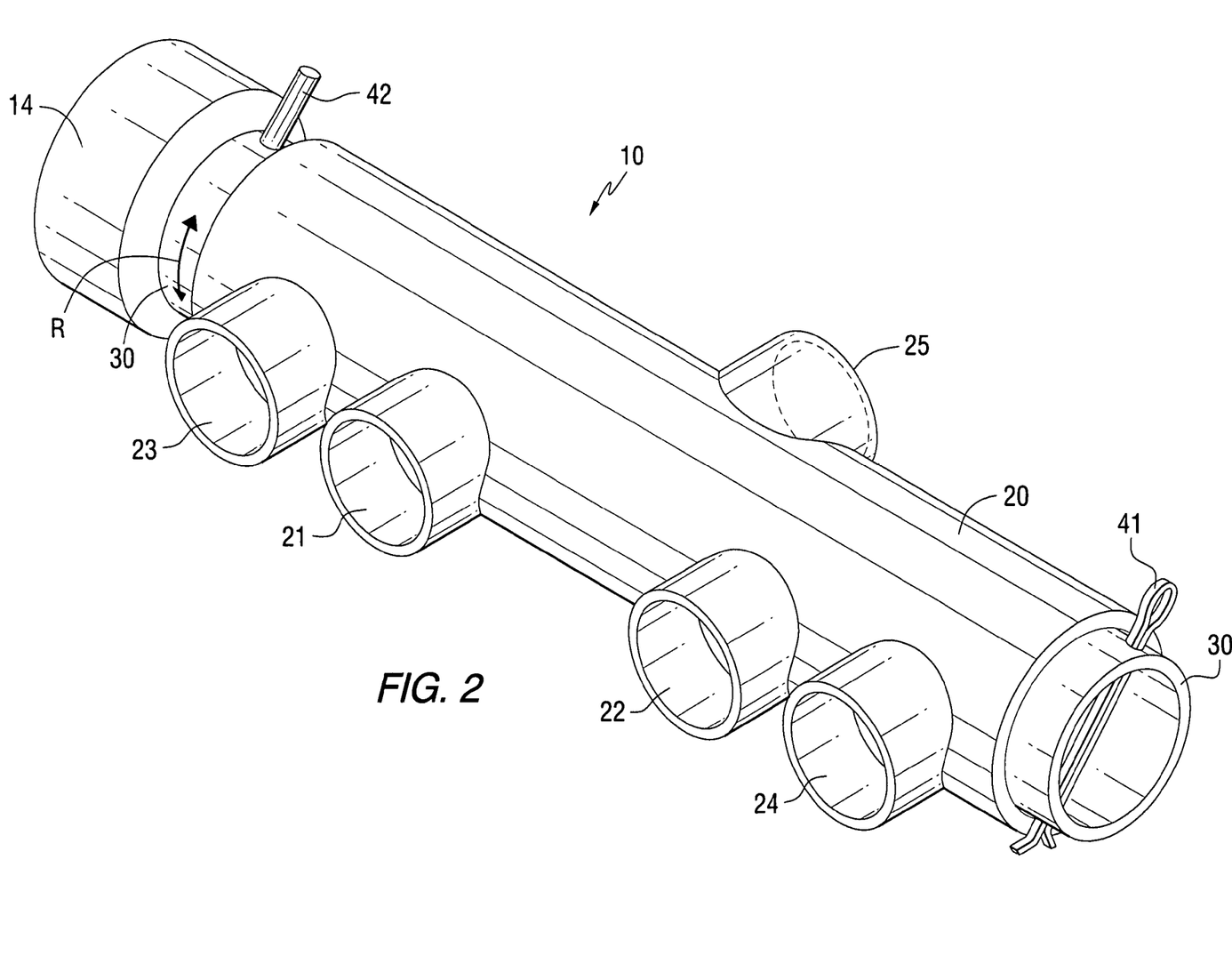
FIG. 2 is an isometric view illustrating a rotary valve in accordance with an embodiment of the present invention.

FIG. 2 illustrates a rotary valve 10 in accordance with an embodiment of the present invention. The rotary valve 10 includes an outer cylindrical sleeve 20, and an inner cylindrical sleeve 30 rotating in a direction as shown by arrow R. The outer cylindrical sleeve 20 includes a pressure port 21, a vacuum port 22, a pressure exhaust port 23, and a vacuum intake port 24. The outer cylindrical sleeve 20 also includes an outlet port 25. The valve motor 14 rotates the inner cylindrical sleeve 30. A cotter pin 41 or other type of fastener or arrangement may optionally be used to hold the inner sleeve 30 in the desired axial position in relation to the outer sleeve 20. A handle 42 may be connected to the inner sleeve 30 in order to manually rotate the inner sleeve 30 if desired.

The inner cylinder may be rotated at any desired rotational velocity, depending on various factors including conduit pipe diameter, length, type of fluid, amount of fluid in the conduit pipe, etc. For example, rotational velocities of from about 1 to about 60 rpm or higher may typically be used when air is delivered through the rotary valve 10 to treat a water or other liquid containing conduit. In this case, the alternating pressure and vacuum pulses may be generated at a frequency of from about 1 to about 60 per minute, and each pressure and vacuum pulse may have a duration of from about 1 to about 60 seconds. However, any other suitable frequencies may be used depending on the particular application.

Figure 3:
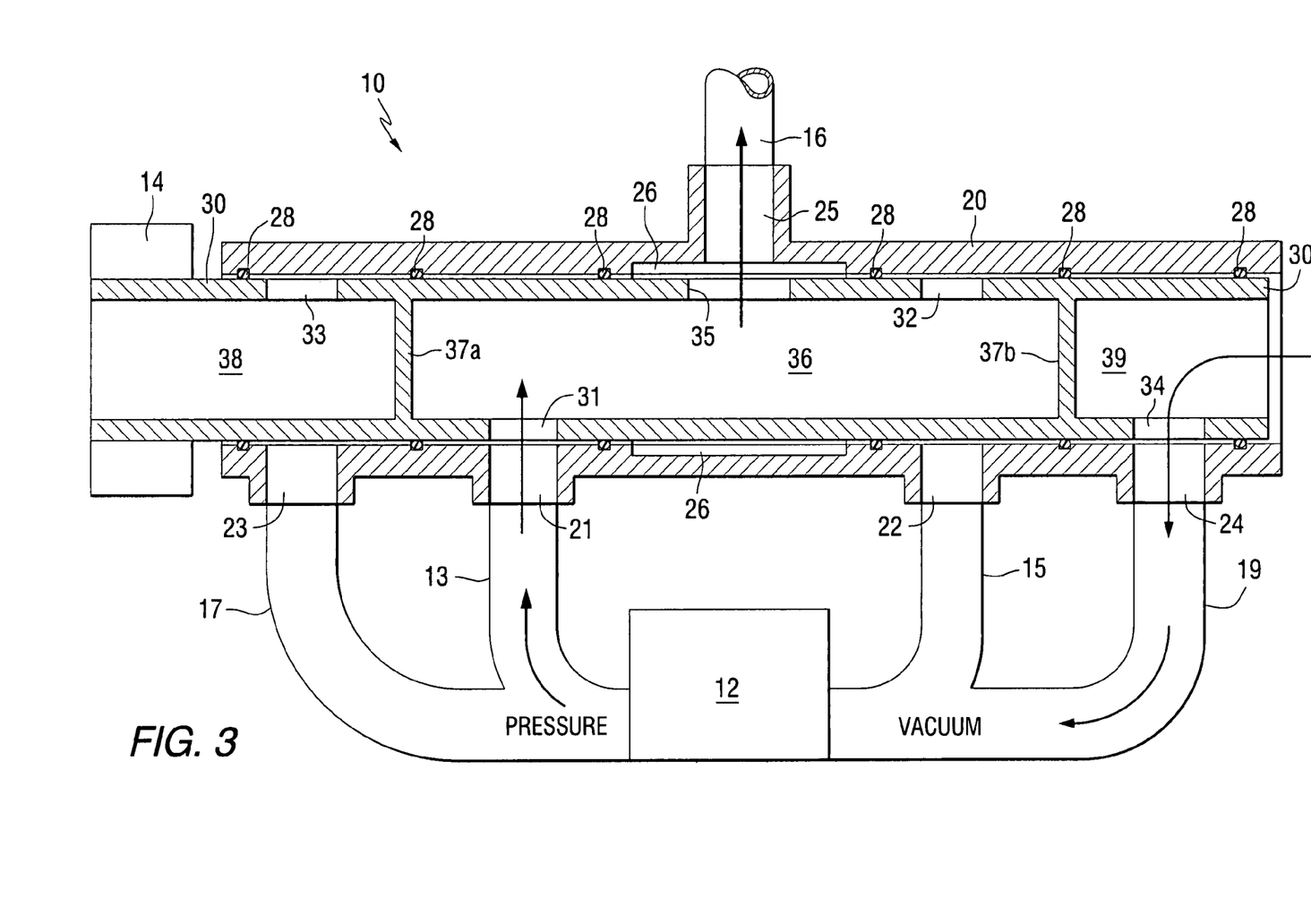
In FIG. 3, an inner cylindrical sleeve having pressure and vacuum ports is rotated to a first position inside an outer cylindrical sleeve in which pressurized fluid such as air is delivered through the rotary valve to an outlet port of the valve.
Figure 4:
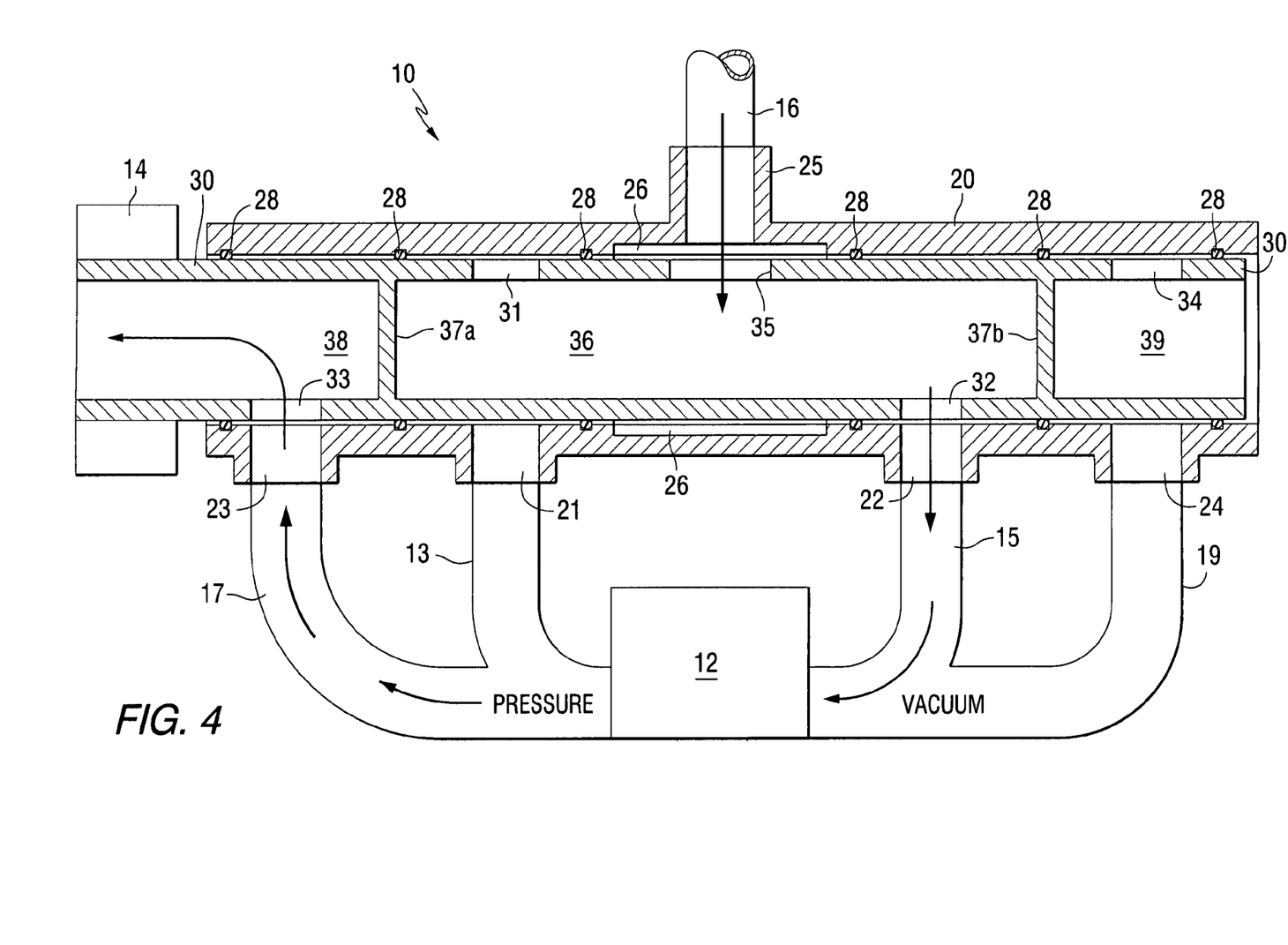
In FIG. 4, the inner cylindrical sleeve is rotated to a second position in which a vacuum is delivered through the rotary valve to the outlet port of the valve.
Figure 5:
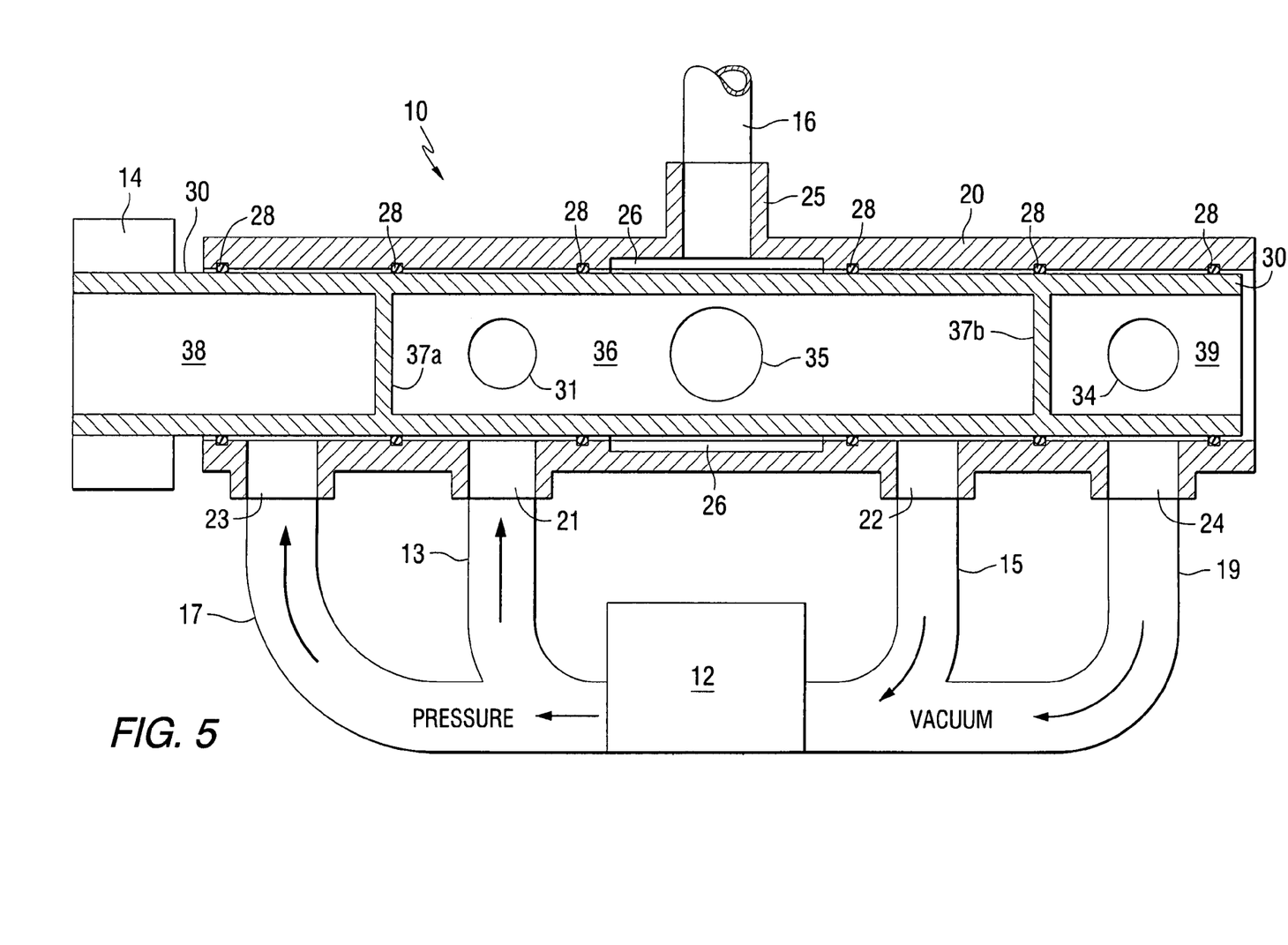

FIGS. 3-5 are longitudinal sectional views of the rotary valve 10. In FIG. 3, the inner cylindrical sleeve 30 is rotated to a position which results in the delivery of pressurized fluid from the outlet port 25 of the outer cylindrical sleeve 20. In FIG. 4, the inner cylindrical sleeve is rotated to a position in which a vacuum is delivered to the outlet port 25. In FIG. 5, the inner cylindrical sleeve is rotated between the pressure and vacuum positions of FIGS. 3 and 4, respectively.

As shown in FIGS. 3-5, the pressure and vacuum source 12 is connected by a pressure line 13 to the pressure port 21 of the outer sleeve 20. A vacuum line 15 is connected between the vacuum port 22 of the outer sleeve 20 and the pressure and vacuum source 12. A pressure exhaust line 17 is connected between the pressure and vacuum source 12 and the pressure exhaust port 23 of the outer sleeve 20. A vacuum intake line 19 is connected between the vacuum intake port 24 of the outer sleeve 20 and the pressure and vacuum source 12.

The outer cylindrical sleeve 20 includes a circumferential channel 26 extending around its inner diameter in flow communication with the outlet port 25. Several O-ring seals 28 are provided between the inner diameter of the outer sleeve 20 and the outer diameter of the inner sleeve 30. The O-rings seals 28 are under slight compression between the outside diameter of the inner sleeve 30 and the inside diameter of the outer sleeve 20. They do not significantly restrict the rotation of inner sleeve 30 with respect to outer sleeve 20. Although not shown in the figures, additional seals may be provided adjacent to the various ports in order to provide additional sealing, if desired.

The inner cylindrical sleeve 30 includes a pressure port 31, a vacuum port 32, a pressure exhaust port 33, and a vacuum intake port 34. In addition, the inner sleeve includes an outlet port 35 which is in flow communication with the circumferential channel 26 of the outer sleeve 20. As most clearly shown in FIGS. 6 and 7, the pressure port 31, vacuum port 32, pressure exhaust port 33, and vacuum intake port 34 of the inner sleeve 30 are coordinated with the pressure port 21, vacuum port 22, pressure exhaust port 23, and vacuum intake port 24 of the outer sleeve 20 in such a manner that rotation of the inner sleeve 30 with respect to the outer sleeve 20 results in different alignments of the various ports. In the embodiments shown in the figures, the various ports in the outer sleeve 20 and inner sleeve 30 are circular, with diameters smaller than the diameters of their respective sleeves, e.g., their diameters may be from about 1 to about 95 percent or greater of the outer diameters of their respective sleeves.

Referring to FIG. 3, the pressure port 31 of the inner sleeve 30 is aligned with the pressure port 21 of the outer sleeve 20. Also, the vacuum intake port 34 of the inner sleeve 30 is aligned with the vacuum intake port 24 of the outer sleeve 20. In this position, pressure from the source 12 is provided through the pressure line 13, through the aligned pressure ports 21 and 31, and into an interior chamber 36 of the inner sleeve 30. The interior chamber 36 is formed by chamber baffles 37a and 37b. In FIG. 3, the pressurized interior chamber 36 communicates through the outlet port 35 of the inner sleeve 30 and through the outlet port 25 of the outer sleeve 20 to pressurize the outlet hose 16 and/or the conduit 18.

As further shown in FIG. 3, the inner sleeve 30 includes an open vacuum intake end 39 which communicates with the ambient atmosphere. In the position shown in FIG. 3, the pressure and vacuum source 12 draws a vacuum through the vacuum intake line 19, vacuum intake port 24, vacuum intake port 34 and open vacuum intake end 39. Thus, in FIG. 3, the vacuum side of the pressure and vacuum source 12 is connected with the surrounding atmosphere. The vacuum port 22 of the outer sleeve 20 and the vacuum line 15 are effectively sealed off by the circumferential wall of the inner sleeve 30. In addition, the pressure exhaust port 23 of the outer sleeve 20 and the pressure exhaust line 17 are effectively sealed off by the circumferential wall of the inner sleeve 30.

In FIG. 4, the inner sleeve 30 has been rotated 180 degrees from the first pressure delivery position shown in FIG. 3 to a second vacuum delivery position. In the vacuum delivery position of FIG. 4, the vacuum port 32 of the inner sleeve 30 is aligned with the vacuum port 22 of the outer sleeve 20. Furthermore, the pressure exhaust port 33 of the inner sleeve 30 is aligned with the pressure exhaust port 23 of the outer sleeve 20. As shown in FIG. 4, the pressure port 21 of the outer sleeve 20 and the pressure line 13 are effectively sealed off by the circumferential wall of the inner sleeve 30. Also, the vacuum intake port 24 of the outer sleeve 20 and the vacuum intake line 19 are effectively sealed off by the circumferential wall of the inner sleeve 30. In the position shown in FIG. 4, the vacuum generated by the source 12 creates a vacuum through the vacuum line 15, aligned vacuum ports 22 and 32, interior chamber 36, and aligned output port 35 and outlet port 25. The rotary valve 10 acts to draw a vacuum through the outlet hose 16 and/or conduit 18. Pressure generated by the source 12 in FIG. 4 is directed through the pressure exhaust line 17, aligned pressure exhaust ports 23 and 33, and into an open pressure exhaust end 38 of the inner sleeve 30. The open pressure exhaust end 38 is open to the ambient atmosphere, e.g., through a central opening in the valve motor 14.

FIG. 5 illustrates a rotational position of the inner sleeve 30 between the pressure delivery position shown in FIG. 3 and the vacuum delivery position shown in FIG. 4. As shown in FIG. 5, none of the pressure or vacuum ports are aligned, thus preventing flow into the inner chamber 36 and through the outlet port 25. In this no-flow transitional position, neither the pressure line 13 nor the vacuum line 15 are connected with the interior chamber 36 of the inner sleeve 30, with the net affect being cancellation of the pressure or vacuum delivered through the outlet hose 16 and/or conduit 18. This results in substantially no flow through the pressure and vacuum source 12.

Figure 6:
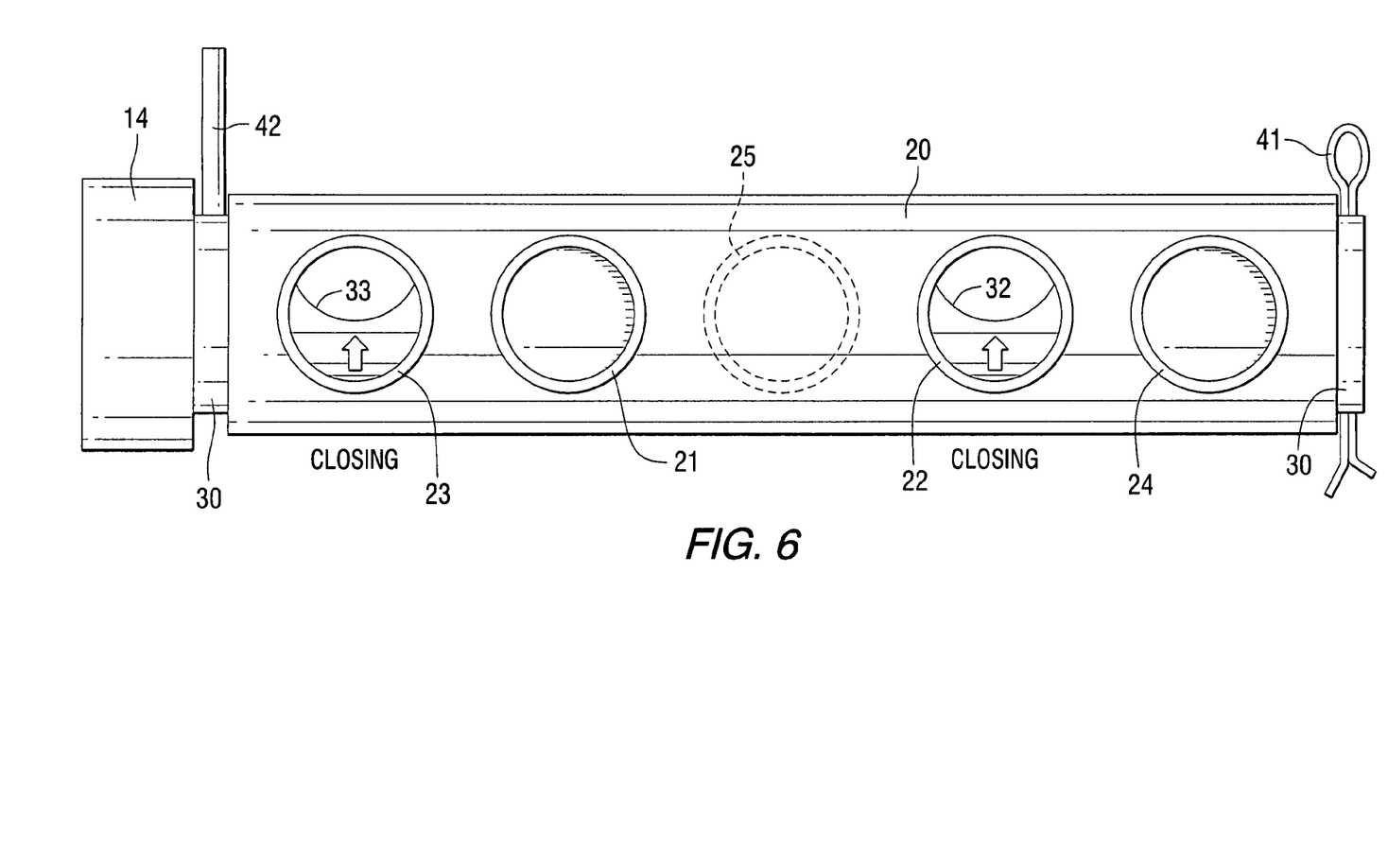
FIG. 6 is a side view of the rotary valve of FIGS. 2-5, showing the vacuum port of the inner cylindrical sleeve closing with respect to the vacuum port of the outer cylindrical sleeve, corresponding to rotation of the inner sleeve from the vacuum position shown in FIG. 4 toward the pressure position shown in FIG. 3.

FIG. 6 is a view looking into the ports 21, 22, 23 and 24 of the outer sleeve 20 after some rotation of the inner sleeve 30, i.e., a 45 degree rotation from the vacuum position shown in FIG. 4. As the inner sleeve 30 rotates in the direction of the arrows, the vacuum port 32 and the pressure exhaust port 33 of the inner sleeve 30 are closing, while the pressure port 31 and the vacuum intake port 34 are not yet opening.

Figure 7:
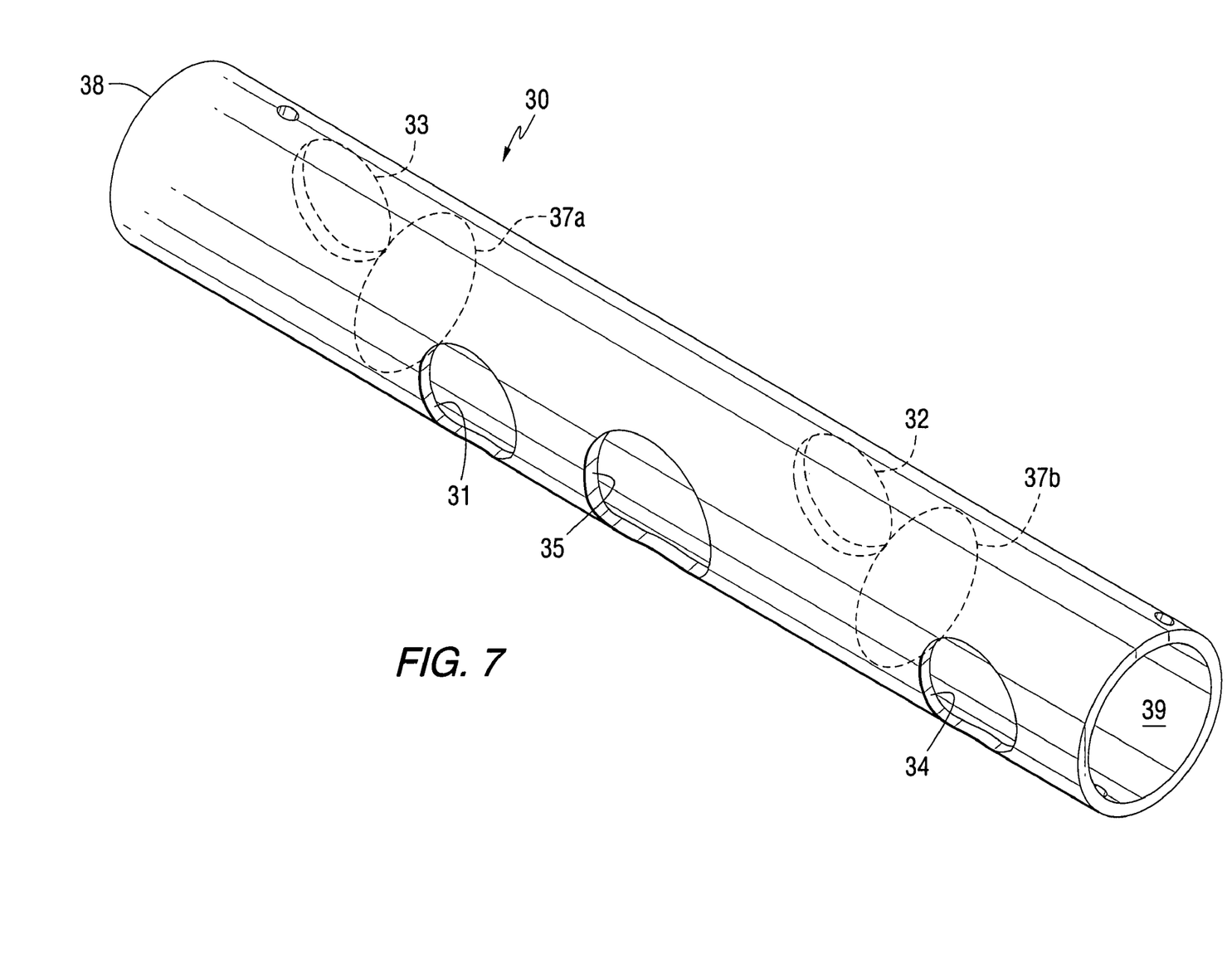
FIG. 7 is an isometric view of the inner cylindrical sleeve of the rotary valve shown in FIGS. 2-6, illustrating the location of the pressure and vacuum ports at staggered locations along the length and circumference of the inner cylinder.

FIG. 7 is an isometric view of the inner sleeve 30 of FIGS. 3-6, illustrating the locations of the pressure port 31, vacuum port 32, pressure exhaust port 33, vacuum intake port 34 and outlet port 35 at their positions along the length and circumference of the inner sleeve 30.

Figure 8:
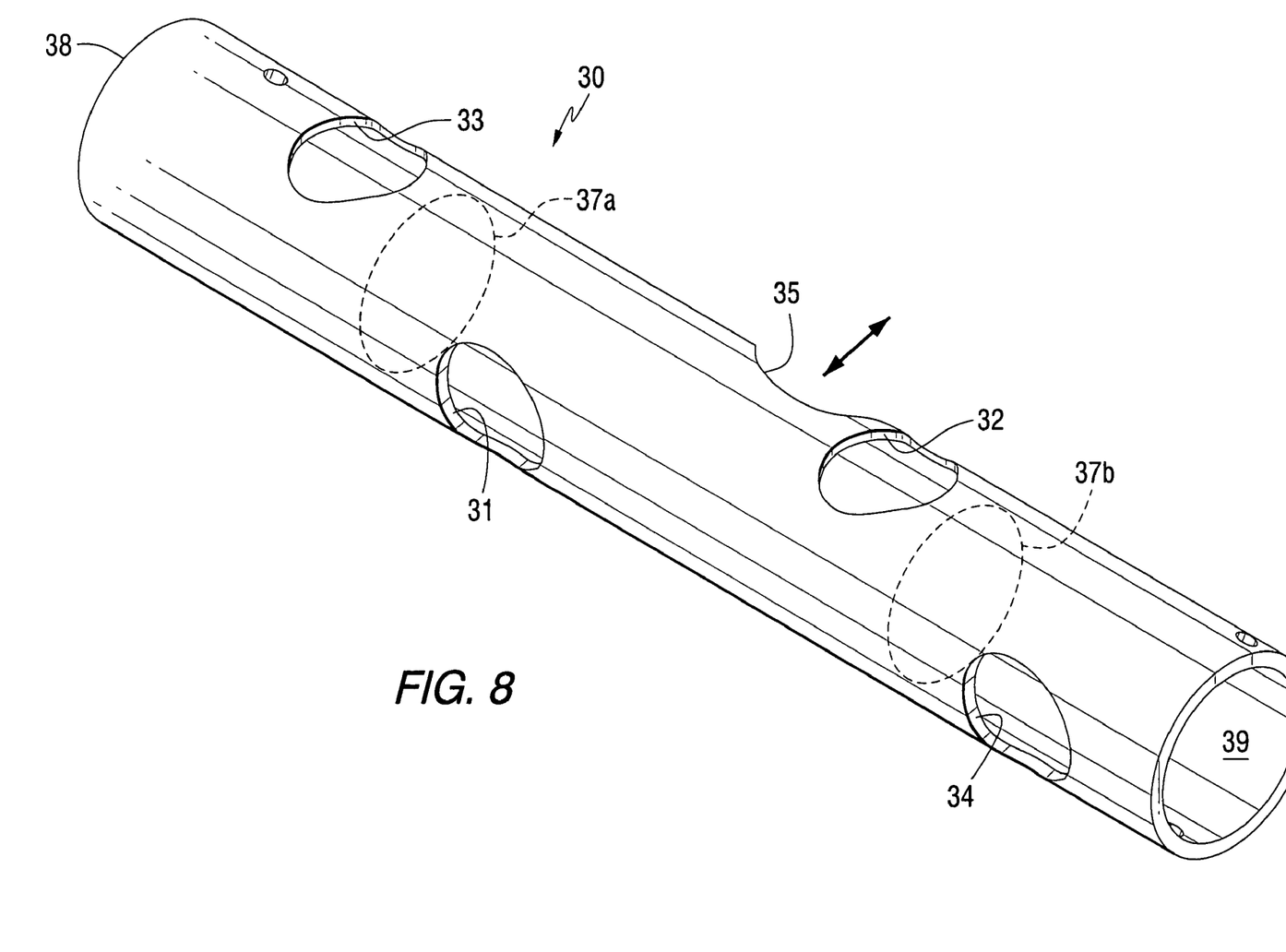
FIG. 8 is an isometric view of an inner cylindrical sleeve similar to the inner sleeve of FIG. 7, with the pressure, vaccum, pressure exhaust, vacuum intake and outlet ports arranged at different circumferential positions.

FIG. 8 illustrates an inner cylindrical sleeve 30 similar to FIG. 7, except the pressure exhaust port 33, the vacuum port 32, and the outlet port 35 are located at different locations around the circumference of the sleeve 30 in relation to the pressure port 31 and the vacuum intake port 34. In FIG. 8, the pressure exhaust port 33 and the vacuum port are circumferentially offset 90 degrees from the pressure port 31 and the vacuum intake port 34, versus an offset of 180 degrees in FIG. 7. Also in FIG. 8, the outlet port 35 is circumferentially offset 180 degrees from the pressure port 31 and the vacuum intake port 34, versus being aligned in FIG. 7. Many other such modifications of the locations, shapes, sizes and numbers of inner sleeve ports, as well as outer sleeve ports, are possible in accordance with the present invention.

The shapes and locations of the ports in the inner and outer sleeves can be altered to adjust the rate of change from pressure to vacuum and vice-versa. Also, the number and size of the ports, and the size of the cylindrical sleeves can be adjusted to obtain various performance characteristics. By varying the geometry of the pressure and vacuum ports on the inner and outer sleeves, varied pulse forms may be created and fluid flow and direction may be adjusted. For example, instead of circular ports as shown in the drawings, other port shapes such as elliptical, triangular, square, etc., may be used to change the form of the pulse in the conduit. The running clearance between the outer and inner sleeves 20 and 30 should be minimized or sealed in order to reduce or eliminate leakage. For example, the clearance may be from 0 to 1 mm, typically from 0.01 to 0.05 or 0.1 mm. The configuration of the cylindrical sleeves can be changed to enhance compactness and facilitate motor drive. It is also possible to use a multiple of motor/blowers in series or in parallel to enhance performance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A system for providing alternating pressure and vacuum pulses to a conduit comprising:
    a source of pressure and vacuum; and
    a rotary valve communicating with the source of pressure and vacuum, wherein the rotary valve comprises:
        an outer sleeve having pressure and vacuum ports in flow communication with the source of pressure and vacuum, and an outlet port for delivering the alternating pressure and vacuum pulses to the conduit; and
        a generally cylindrical inner sleeve rotatably mounted at least partially inside the outer sleeve and including pressure and vacuum ports, wherein when the inner sleeve is located at a first rotational position with respect to the outer sleeve a pressure port of the inner sleeve is aligned with the pressure port of the outer sleeve to deliver pressure to the outlet port of the outer sleeve, and when the inner sleeve is located at a second rotational position with respect to the outer sleeve the vacuum port of the inner sleeve is aligned with the vacuum port of the outer sleeve to deliver vacuum to the outlet port of the outer sleeve, and wherein the pressure and vacuum ports of the inner sleeve are located at different positions along an axial length of the inner sleeve.

2. The system of claim 1, wherein the outer sleeve is generally cylindrical.

3. The system of claim 2, wherein the pressure and vacuum ports of the outer sleeve are substantially aligned along an axial length of the outer sleeve.

4. The system of claim 1, wherein the pressure and vacuum ports of the inner sleeve are offset at different circumferential locations around a circumference of the inner sleeve.

5. The system of claim 4, wherein the circumferential offset of the pressure and vacuum ports of the inner sleeve is from about 30 to about 180 degrees.

6. The system of claim 4, wherein the circumferential offset of the pressure and vacuum ports of the inner sleeve is about 180 degrees.

7. The system of claim 1, wherein the pressure port and the vacuum port of the inner sleeve have shapes that are substantially circular, elliptical, rectangular or triangular.

8. The system of claim 7, wherein the pressure port and vacuum port of the inner sleeve are circular and have diameters that are from 5 to 95 percent of an outer diameter of the inner sleeve.

9. The system of claim 1, wherein the outer sleeve has an inner diameter, the inner sleeve has an outer diameter, and a clearance is provided between the inner diameter of the outer sleeve and the outer diameter of the inner sleeve.

10. The system of claim 9, wherein the clearance is from about 0.01 to about 0.1 mm.

11. The system of claim 9, further comprising O-ring seals between the outer and inner sleeves.

12. The system of claim 1, wherein the inner sleeve comprises an outlet port in flow communication with the outlet port of the outer sleeve.

13. The system of claim 12, wherein the pressure port, vacuum port, and outlet port of the inner sleeve are in flow communication with an interior chamber of the inner sleeve.

14. The system of claim 12, wherein the outer sleeve comprises an inner circumferential channel in flow communication with the outlet ports of the outer and inner sleeves.

15. The system of claim 14, where the flow communication of the circumferential channel with the outlet port of the inner sleeve is maintained when the inner sleeve is rotated from the first rotational position to the second rotational position.

16. The system of claim 1, wherein the outer sleeve further comprises a pressure exhaust port in flow communication with the source of pressure and vacuum, and a vacuum intake port in flow communication with the source of pressure and vacuum.

17. The system of claim 16, wherein the inner sleeve further comprises a pressure exhaust port and a vacuum intake port, the vacuum intake port of the inner sleeve is aligned with the vacuum intake port of the outer sleeve when the inner sleeve is located at the first rotational position, and the pressure exhaust port of the inner sleeve is aligned with the pressure exhaust port of the outer sleeve when the inner sleeve is located at the second rotational position.

18. The system of claim 17, wherein the inner sleeve comprises an open pressure exhaust end and an open vacuum intake end.

19. The system of claim 1, further comprising a motor connected to the inner sleeve.

20. The system of claim 19, wherein the motor is a variable speed electric motor.

21. The system of claim 1, further comprising a handle attached to the inner sleeve for manual rotation of the inner sleeve.

22. The system of claim 1, wherein the source of pressure and vacuum comprises a motorized blower.

23. A rotary valve for providing alternating pressure and vacuum pulses, the rotary valve comprising:
    an outer sleeve comprising a pressure port structured and arranged for connection to a source of pressure, a vacuum port structured and arranged for connection to a source of vacuum, and an outlet port; and
    a generally cylindrical inner sleeve rotatably mounted at least partially inside the outer sleeve comprising a pressure port aligned with the pressure port of the outer sleeve when the inner sleeve is located at a first rotational position with respect to the outer sleeve, a vacuum port aligned with the vacuum port of the outer sleeve when the inner sleeve is located at a second rotational position with respect to the outer sleeve, and at least one outlet port in flow communication with the outlet port of the outer sleeve, and wherein the pressure and vacuum ports of the inner sleeve are located at different positions along an axial length of the inner sleeve.

24. A method of generating alternating pressure and vacuum pulses, the method comprising:
    providing a rotary valve having an outer sleeve and a generally cylindrical inner sleeve rotatably mounted at least partially inside the outer sleeve;
    delivering pressure to a pressure port of the outer sleeve;
    delivering vacuum to a vacuum port of the outer sleeve;
    rotating the inner sleeve with respect to the outer sleeve to deliver pressure through the pressure port of the outer sleeve, through a pressure port of the inner sleeve, through an outlet port of the inner sleeve, and through an outlet port of the outer sleeve to generate the pressure pulse, wherein the pressure and vacuum ports of the inner sleeve are located at different positions along an axial length of the inner sleeve; and further rotating the inner sleeve with respect to the outer sleeve to deliver vacuum through the vacuum port of the outer sleeve, through a vacuum port of the inner sleeve, through the outlet port of the inner sleeve, and through the outlet port of the outer sleeve to generate the vacuum pulse.

25. The method of claim 24, further comprising delivering the alternating pressure and vacuum pulses to a conduit.

26. The method of claim 25, further comprising initially delivering pressure to the conduit prior to the delivery of the alternating pressure and vacuum pulses to the conduit in order to position a treatment fluid at a desired location in the conduit.

27. The method of claim 24, wherein the inner sleeve is rotated at a rate of from about 1 to about 60 rpm.

28. The method of claim 24, wherein the alternating pressure and vacuum pulses are generated at a frequency of from about 1 to about 60 per minute.

29. The method of claim 24, wherein each pressure pulse has a duration of from about 1 to about 60 seconds.

30. The method of claim 24, wherein each vacuum pulse has a duration of from about 1 to about 60 seconds.

31. The method of claim 24, wherein the pressure pulses and the vacuum pulses have substantially the same durations.

32. The method of claim 24, wherein the pressure and vacuum pulses are generated at a substantially constant rate.

33. The method of claim 24, wherein the pressure and vacuum pulses are generated at variable rates.

34. The method of claim 24, further comprising substantially stopping the delivery of pressure and the delivery of vacuum between the pressure and vacuum pulses.

35. A system for providing alternating pressure and vacuum pulses to a conduit comprising:
a source of pressure and vacuum; and
a rotary valve communicating with the source of pressure and vacuum, wherein the rotary valve comprises:
a generally cylindrical outer sleeve having pressure and vacuum ports in flow communication with the source of pressure and vacuum, and an outlet port for delivering the alternating pressure and vacuum pulses to the conduit; and
a generally cylindrical inner sleeve rotatably mounted at least partially inside the outer sleeve and including pressure and vacuum ports, wherein when the inner sleeve is located at a first rotational position with respect to the outer sleeve a pressure port of the inner sleeve is aligned with the pressure port of the outer sleeve to deliver pressure to the outlet port of the outer sleeve, and when the inner sleeve is located at a second rotational position with respect to the outer sleeve the vacuum port of the inner sleeve is aligned with the vacuum port of the outer sleeve to deliver vacuum to the outlet port of the outer sleeve, and wherein the pressure and vacuum ports of the outer sleeve are substantially aligned along an axial length of the outer sleeve.

36. A system for providing alternating pressure and vacuum pulses to a conduit comprising:
a source of pressure and vacuum;
a rotary valve communicating with the source of pressure and vacuum, wherein the rotary valve comprises:
an outer sleeve having pressure and vacuum ports in flow communication with the source of pressure and vacuum, and an outlet port for delivering the alternating pressure and vacuum pulses to the conduit; and
an inner sleeve rotatably mounted at least partially inside the outer sleeve and including pressure and vacuum ports and an outlet port in flow communication with the outlet port of the outer sleeve, wherein when the inner sleeve is located at a first rotational position with respect to the outer sleeve a pressure port of the inner sleeve is aligned with the pressure port of the outer sleeve to deliver pressure to the outlet port of the outer sleeve, and when the inner sleeve is located at a second rotational position with respect to the outer sleeve the vacuum port of the inner sleeve is aligned with the vacuum port of the outer sleeve to deliver vacuum to the outlet port of the outer sleeve, and wherein the outer sleeve comprises an inner circumferential channel in flow communication with the outlet ports of the outer and inner sleeves.

37. A system for providing alternating pressure and vacuum pulses to a conduit comprising:
a source of pressure and vacuum;
a rotary valve communicating with the source of pressure and vacuum, wherein the rotary valve comprises:
an outer sleeve having pressure and vacuum ports in flow communication with the source of pressure and vacuum, an outlet port for delivering the alternating pressure and vacuum pulses to the conduit, a pressure exhaust port in flow communication with the source of pressure and vacuum, and a vacuum intake port in flow communication with the source of pressure and vacuum; and
an inner sleeve rotatably mounted at least partially inside the outer sleeve and including pressure and vacuum ports, wherein when the inner sleeve is located at a first rotational position with respect to the outer sleeve a pressure port of the inner sleeve is aligned with the pressure port of the outer sleeve to deliver pressure to the outlet port of the outer sleeve, and when the inner sleeve is located at a second rotational position with respect of the outer sleeve the vacuum port of the inner sleeve is aligned with the vacuum port of the outer sleeve to deliver vacuum to the outlet port of the outer sleeve, and wherein the inner sleeve further comprises a pressure exhaust port and a vacuum intake port, the vacuum intake port of the inner sleeve is aligned with the vacuum intake port of the outer sleeve when the inner sleeve is located at the first rotational position, the pressure exhaust port of the inner sleeve is aligned with the pressure exhaust port of the outer sleeve when the inner sleeve is located at the second rotational position, and the inner sleeve comprises an open pressure exhaust end and an open vacuum intake end.

* * * * *